United States Patent [15] 3,688,032
Dixon et al. [45] Aug. 29, 1972

[54] FACSIMILE TRANSMITTER AND METHOD OF ASSEMBLING THE SAME

[72] Inventors: Paul H. Dixon, Belvidere, Ill.; Paul R. Schmidt, Stevensville, Mich.

[73] Assignee: Dixon Automatic Tool, Inc., Rockford, Ill.

[22] Filed: Sept. 21, 1970

[21] Appl. No.: 73,698

Related U.S. Application Data

[62] Division of Ser. No. 726,408, May 3, 1968, Pat. No. 3,555,266.

[52] U.S. Cl. ................178/7.6, 178/DIG. 27, 350/67
[51] Int. Cl. ................H04n 1/24
[58] Field of Search.......178/7.6, DIG. 27; 350/8, 67, 350/68; 355/43, 49, 51, 57, 60, 65, 66

[56] References Cited

UNITED STATES PATENTS

| | | | |
|---|---|---|---|
| 2,567,307 | 9/1951 | Wise | 178/7.6 |
| 2,209,719 | 7/1940 | Rustad | 178/DIG. 27 |
| 2,696,052 | 12/1954 | Czarnikow | 350/67 |
| 3,049,054 | 8/1962 | Waland | 350/67 |

*Primary Examiner*—Robert L. Griffin
*Assistant Examiner*—Joseph A. Orsino, Jr.
*Attorney*—Wolfe, Hubbard, Leydig, Voit & Osann, Ltd.

[57] ABSTRACT

A facsimile transmitter includes a lamp for directing a light beam toward a scanner which reflects the light onto a document to be reproduced, picks up the light reflected from the document and directs such light to a photomultiplier operable to send to a reproducing recorder as electrical signal proportional to the intensity of the light and the shade value of the document. The lamp is accurately pre-located and pre-mounted in a permanent holder which is detachably secured to a lamp housing and which, as an incident to attachment to the housing, automatically locates the lamp in a precisely established position to produce light of maximum intensity, the pre-mounted lamp being located in such position by the holder regardless of dimensional irregularities in the lamp. To focus the light beam on the document accurately and to direct the reflected light along an exact path toward the photomultiplier, the scanner is formed as two initially adjustable telescopic units carrying relatively simple plane mirrors adapted to be adjusted into precisely established positions by sliding and rotating the units and thereafter held permanently in such positions by bonding the units rigidly together.

9 Claims, 22 Drawing Figures

INVENTOR
Paul H. Dixon

Paul R. Schmidt
Wolfe, Hubbard, Leydig, Voit & Osann
ATTORNEYS

INVENTORS
Paul H. Dixon
Paul R. Schmidt
Wolfe, Hubbard, Leydig, Voit & Osann
ATTORNEYS INVENTOR
Paul H. Dixon
Paul R. Schmidt
Wolfe, Hubbard, Leydig, Voit & Osann
ATTORNEYS INVENTOR
Paul H. Dixon Paul R. Schmidt
Wolfe, Hubbard, Leydig, Voit & Osann
ATTORNEYS INVENTORS
Paul H. Dixon
Paul R. Schmidt
Wolfe, Hubbard, Leydig, Voit & Osann
ATTORNEYS INVENTOR
Paul H. Dixon
Paul R. Schmidt
Wolfe, Hubbard, Leydig, Voit & Osann
ATTORNEY

FACSIMILE TRANSMITTER AND METHOD OF ASSEMBLING THE SAME

CROSS-REFERENCE TO A RELATED APPLICATION

This application is a division of our copending application Ser. No. 726,408, filed May 3, 1968 now U.S. Pat. No. 3,555,266.

BACKGROUND OF THE INVENTION

This invention relates to a facsimile transmitter of the type which includes at least one scanner movable across a document to be reproduced and operable to create a signal which varies in proportion to the shading of the document. After suitable conversion, the signal usually is transmitted over telephone wires to a recorder which responds to the signal and produces a facsimile of the scanned document.

More particularly, the invention relates to a facsimile transmitter such as is disclosed in the Dixon U.S. Pat. No. 3,553,359 in which the scanner, in moving across the document, receives a light beam directed from an electric lamp, focuses the light in a very small spot on the document as the latter is scanned, picks up the light reflected off of the document, and directs such light to a light-to-signal transducer which produces an electrical signal proportional to the intensity of the reflected light and to the shade value of the scanned portion of the document. The light from the lamp is directed onto the document and the light reflected off of the document is directed to the transducer by reflecting apparatus carried by the scanner and movable within the light beam emitted from the lamp.

SUMMARY OF THE INVENTION

The general aim of the present invention is to insure that the intensity of the light directed to the light-to-signal transducer will be precisely representative of the shade value of the scanned portion of the document in order to promote the production of sharp and uniform facsimiles.

In keeping with this aim, an object of the invention is to provide in the scanner a novel reflecting apparatus capable of being mass produced to exacting standards to effect accurate directing of the light onto the document and toward the transducer. A further object is to form the reflecting apparatus as two separate reflectors which may be located in precisely established positions to focus the light spot accurately on the document and to direct the light reflected from the document along an exact path toward the light-to-signal transducer. A related object is to provide a new and improved scanner in which the reflectors may be adjusted relative to one another into their precisely established positions and thereafter fixed rigidly and permanently in such positions.

In more detailed aspects, the invention is featured by the construction of the scanner as two basic units to enable relative positioning of the reflectors and by the method of assembling the units to locate the reflectors accurately relative to one another. Also, the invention resides in the novel method of preparing the scanner for installation in the transmitter to insure accurate alinement of the reflectors with the lamp and the transducer.

Other objects and advantages of the invention will become apparent from the following detailed description taken in conjunction with the accompanying drawings.

DESCRIPTION OF THE PREFERRED EMBODIMENT

Figure 1:
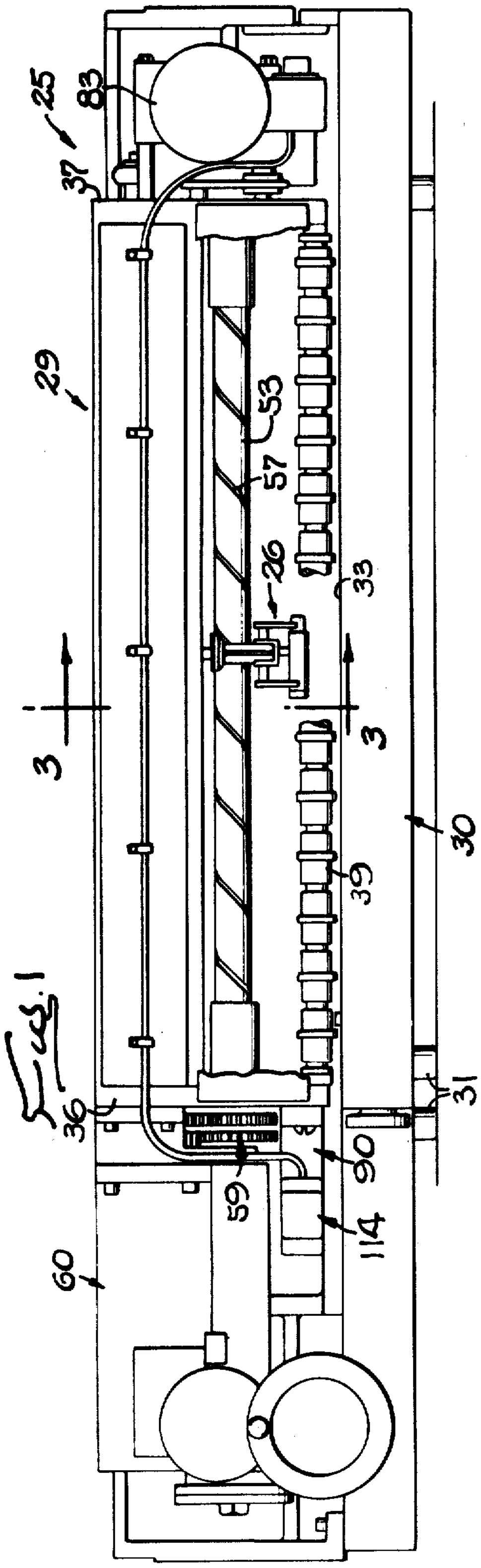
FIG. 1 is a front elevation of a new and improved facsimile transmitter embodying the novel features of the present invention.

As shown in the drawings for purposes of illustration, the invention is embodied in a facsimile transmitter 25 having a scanning mechanism 26 movable across a document 27 (FIGS. 2 and 3) to be reproduced and operable to detect changes in the shading of any pictures or printed matter contained on the face of the document. As an incident to such detection, an electrical signal if produced which varies in accordance with changes in the shade value of the different areas of the document. The signal usually is transmitted over long distances by one or more telephone lines to a recorder (not shown) which operates to print a facsimile of the scanned document in response to receiving the signal.

A detailed description of the overall construction and operation of the transmitter 25 is contained in the aforementioned Dixon U.S. Pat. No. 3,553,359 and only so much of that description as is necessary to gain an understanding of the features of the present invention will be repeated here. Briefly, the transmitter includes a frame with a head 29 which supports the scanning mechanism 26 and which is suspended above a base 30 mounted on short legs 31 and formed with a generally flat top surface 33 (FIG. 3) upon which the document 27 is placed. The scanning mechanism moves across the printed upper face of the document from left to right (as viewed in FIGS. 1 and 2) to scan the document line-by-line at the same time the document is fed in a horizontal plane beneath the scanning mechanism from the front of the base to the rear of the base (or from right to left as viewed in FIG. 3) by a pair of power-driven feed rollers 34 (FIG. 3) journaled in the base. As the document is fed from one feed roller to the other, it passes across an elongated anvil 35 located between the two rollers and defining a surface which supports and underlies the document during scanning.

Herein, the head 29 is in the form of an inverted box-like enclosure (see FIGS. 1 and 3) overhanging the base 30 and formed with left and right end walls 36 and 37 which journal a pair of pressure rollers 39 (FIG. 3) located near the open lower end of the enclosure in overlying relation with the document 27 to press the latter into frictional engagement with the feed rollers 34. A hold-down plate 40 carried by the head is located between the pressure rollers to hold the document lightly against the anvil 35 and is formed with a longitudinal slot 41 extending along the length of the anvil. The scanning mechanism 26 also is carried within the head and includes a pair of substantially identical optical scanners 43 and 44 alternately operable to make a scanning pass across the document from left to right as viewed in FIGS. 1 and 2 (to which all directions of movement hereinafter will be referenced unless expressly indicated otherwise).

Figure 3:
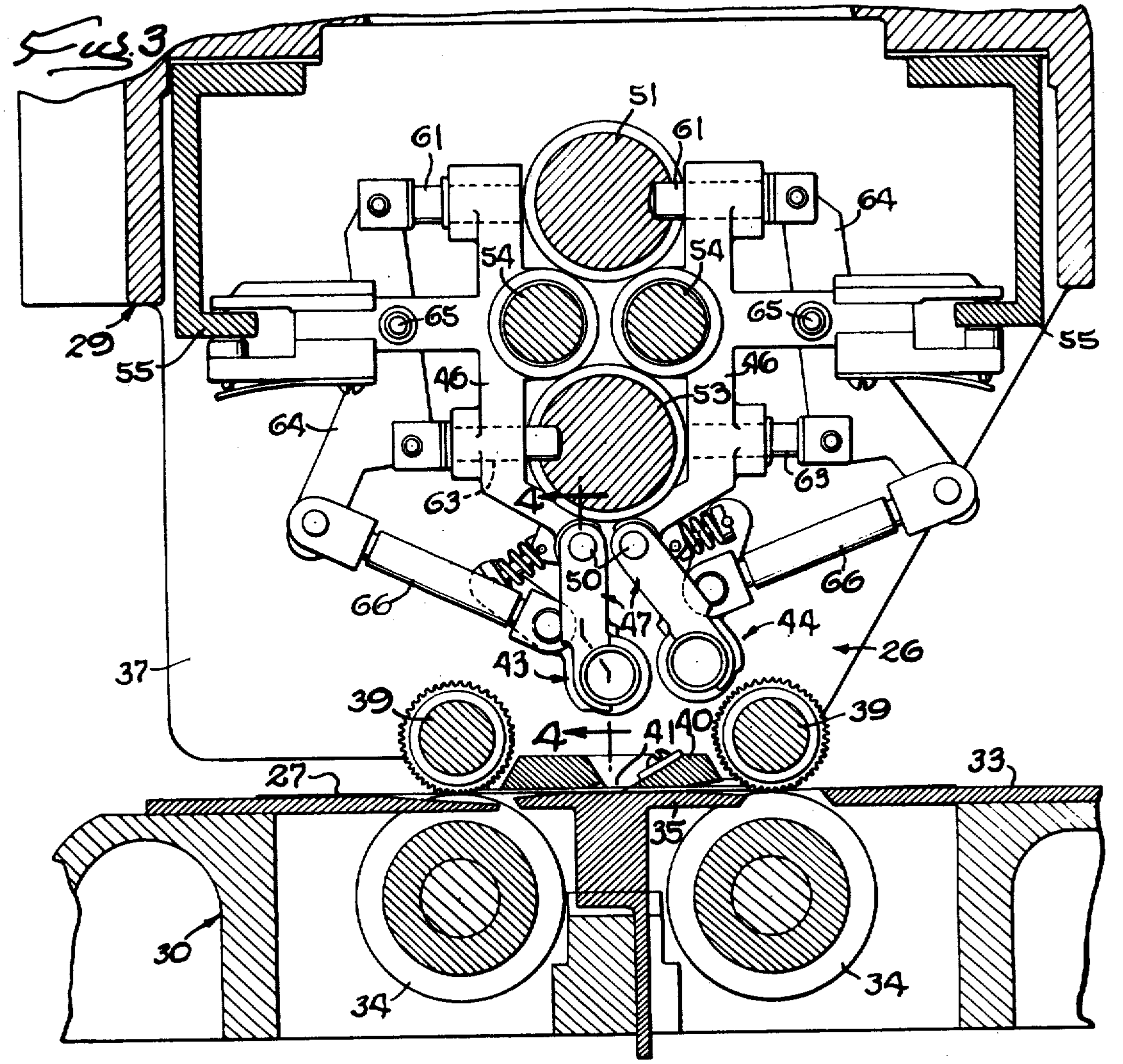
FIG. 3 is an enlarged fragmentary cross-section taken substantially along the line 3—3 of FIG. 1.
Figures 5, 6:
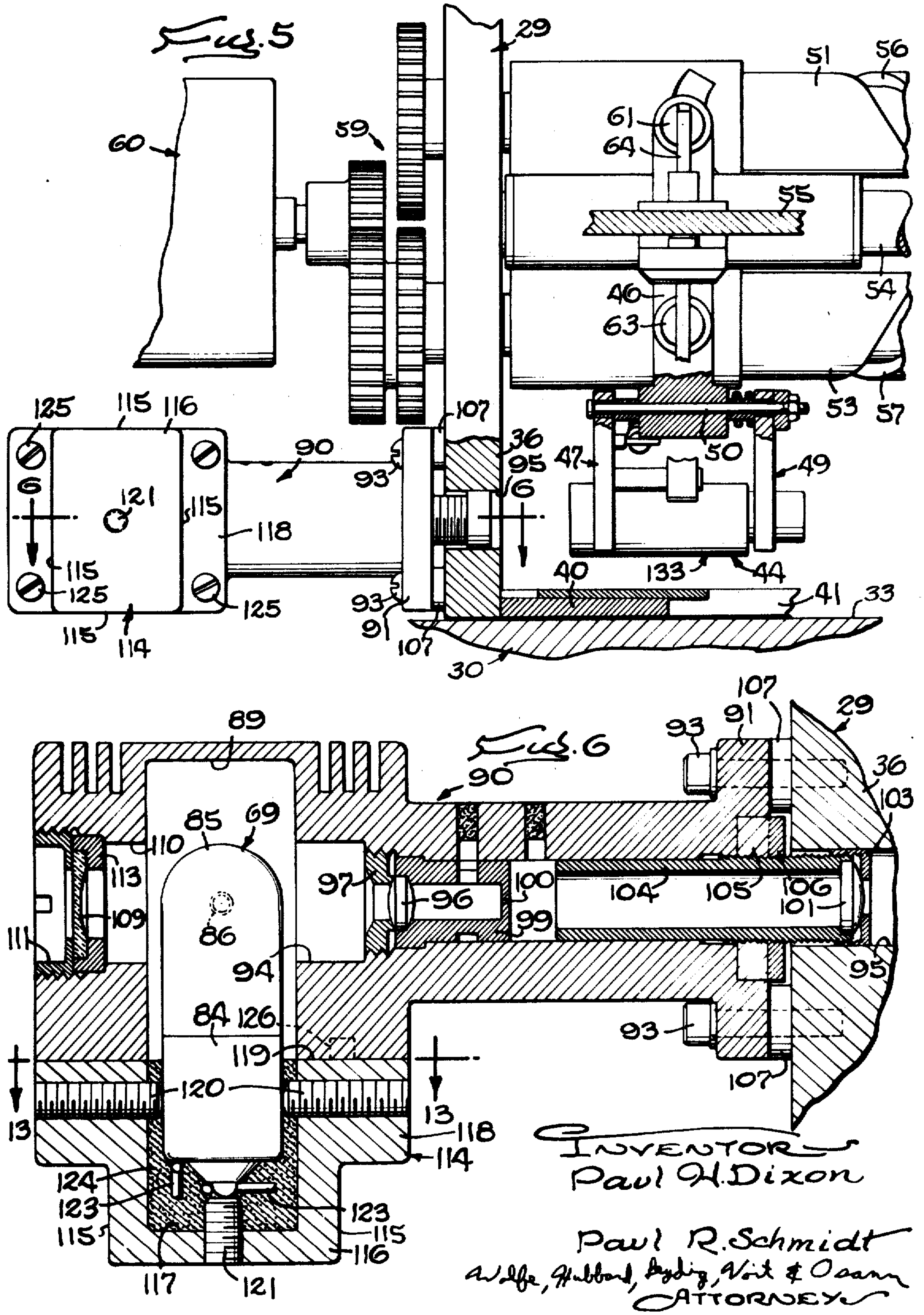
FIG. 5 is a fragmentary side elevation of apparatus shown in FIG. 3 with parts broken away and shown in section.
FIG. 6 is an enlarged fragmentary cross-section taken substantially along the line 6—6 of FIG. 5.

As shown most clearly in FIGS. 3 and 5, the scanners 43 and 44 are mounted on separate carriages 46 and each includes a pair of mounting elements 47 and 49 connected swingably to a horizontal pin 50 rigid with the lower end of the overlying carriage. The two carriages are located on opposite sides of upper and lower power-driven screws 51 and 53 extending between the end walls 36 and 37 and are guided for independent back and forth movement along the screws by guide rods 54 and guide channels 55 extending between the end walls.

During scanning of the document 27, one of the scanners 43, 44 is located initially in a scanning position overlying the slot 41 in the hold down plate 40 (as exemplified by the position of the scanner 43 in FIG. 3) and is driven from left to right in a horizontal path across the upper face of the document through a scanning stroke to detect the shade value of a very narrow line of the document underlying the slot. At the same time, the scanner 44 is located in an inactive position (see FIG. 3) offset laterally from the slot and is driven reversely or from right to left through a return stroke, the inactive scanner simply returning idly toward the left end wall 36 to a starting position preparatory to making a scanning pass and not detecting the shade value of the document during such return. The active scanner 43 reaches the end of its scanning stroke at the same time the inactive scanner 44 reaches the end of its return stroke and, at this time, the scanner 43 is swung clockwise (FIG. 3) about its associated mounting pin 50 to an inactive position offset from the slot 41, and the scanner 44 is swung clockwise about its mounting pin 50 to a scanning position overlying the slot. Thereafter, the scanner 44 is driven from left to right through a scanning stroke to detect the shade value of the succeeding line of the advancing document at the same time the scanner 43 is being driven idly from right to left through a return stroke. As the scanners reach the ends of their strokes, they once again switch positions and reverse directions. As a result, the scanners operate alternately to scan the document continuously with the scanning first being effected by one scanner and then by the other scanner.

The scanners 43 and 44 are driven across the document 27 by the screws 51 and 53 which are formed with oppositely spiraled threads 56 and 57 (FIG. 5), respectively, and which are power-rotated in a clockwise direction through gearing 59 driven by a motor and transmission unit 60 on the head 29. Upper and lower drive fingers 61 and 63 (FIG. 3) carried on levers 64 pivoted to the carriages 46 and 65 alternately rock into and out of driving engagement with the threads of the screws to cause the scanners to move across the document in response to rotation of the screws. When one of the lower driving fingers 63 is in driving engagement with the lower screw 53, the associated scanner is driven through its scanning stroke and, when one of the upper fingers 61 is in engagement with the upper screw 51, the associated scanner is driven reversely through its return stroke. The lower finger of the scanner 43 is in driving engagement with the lower screw at the same time the upper finger of the scanner 44 is in driving engagement with the upper screw, and vice versa, such that the two scanners are always driven in opposite directions. Cam surfaces (not shown) near the ends of the screws rock the upper finger of each scanner into driving engagement with the upper screw when the scanner approaches the end of its scanning stroke and rock the lower finger of each scanner into driving engagement with the lower screw when the scanner approaches the end of its return stroke. As the driving fingers are shifted into and out of driving engagement, the levers 64 rock about the pivots 65 and, through coupling links 66, automatically swing the scanners in proper sequence about the pins 50 between their scanning and inactive positions. Reference is made to the copending application mentioned above for a more detailed description of the construction and operation of the mechanism for swinging the scanners between their scanning and inactive positions and for driving the scanners alternately through scanning strokes across the document.

Figure 2:
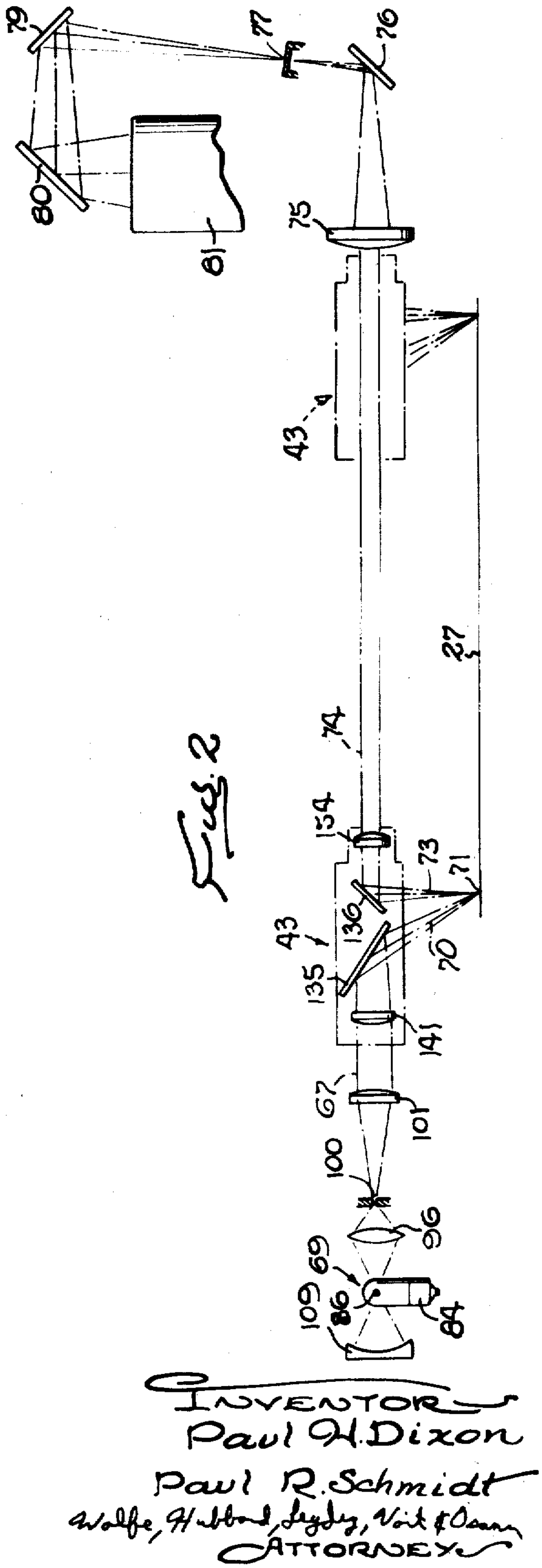
FIG. 2 is a diagrammatic illustration of the path followed by the light beam as it is directed from the lamp onto the document by the scanner and then is picked up and directed to the transducer.

In order to detect and signal the shade value of the printing on the document 27, a collimated light beam 67 (FIG. 2) emitted from a light source 69 near the left end wall 36 is directed from left to right across the document along the same horizontal path followed by the scanners 43, 44 as the latter move through their scanning strokes, is intercepted by that particular scanner which is being moved through its scanning stroke and which is disposed in its scanning position overlying the slot 41, and is reflected downwardly through the slot and onto the document by the active scanner as indicated by the rays 70 in FIG. 2. While the light beam 67 is being directed onto the document by the active scanner, the inactive scanner is offset laterally from the beam and does not affect the light. The light 70 is reflected downwardly by the active scanner, is focused in an extremely small spot 71 (FIG. 2) on the document 27 and is reflected back upwardly toward the scanner as indicated by the rays 73. The intensity of the reflected light 73 varies in accordance with changes in the shade value of the printing or pictures on the document and thus is indicative of the lightness or darkness of that portion of the document upon which the spot 71 is located at any given time. That is, the intensity of the reflected light 73 increases as lighter areas of the document are scanned by the spot and decreases as the darker areas are scanned. Accordingly, as one of the scanners makes a scanning pass across the document, the intensity of the light 73 changes in proportion to changes in the shading of that particular narrow line of the document scanned by the spot during such pass.

As the light 73 is reflected back upwardly from the document 27, it is picked up by the active scanner and is directed ahead of the scanner and back along the original horizontal path in a collimated beam 74 (FIG. 2) whose intensity, of course, also is representative of the shading of the document. The beam 74 is directed through a lense 75 (shown schematically in FIG. 2) located in the right end wall 37 of the head 29 and is reflected off of a mirror 76 through an iris 77 having an aperture with a diameter of approximately 0.046 inch to form an integrated light spot while admitting a minimum of ambient light. After passing through the iris, the light is reflected off of mirrors 79 and 80 to a light-to-signal transducer 81 which responds to the light to produce an electrical signal proportional to the intensity of the light. After conversion and amplification, the electrical signal is transmitted to the reproducing recorder which operates in response to reception of the signal to create a facsimile of that portion of the document which was scanned to produce the signal. The transducer 81 is mounted in a casing 83 (FIG. 1) on the outside of the right end wall 37 and herein comprises a photomultiplier tube such as No. 8053 tube sold by The Radio Corporation of America. While a photomultiplier has been illustrated, other types of photosensitive and electrical signaling devices may be used as, for example, a photovoltaic, a photocell, a photo-resistive semi-conductor, and other similar devices for sensing the intensity of a light beam and producing an electrical signal proportional to such intensity.

Figure 7:
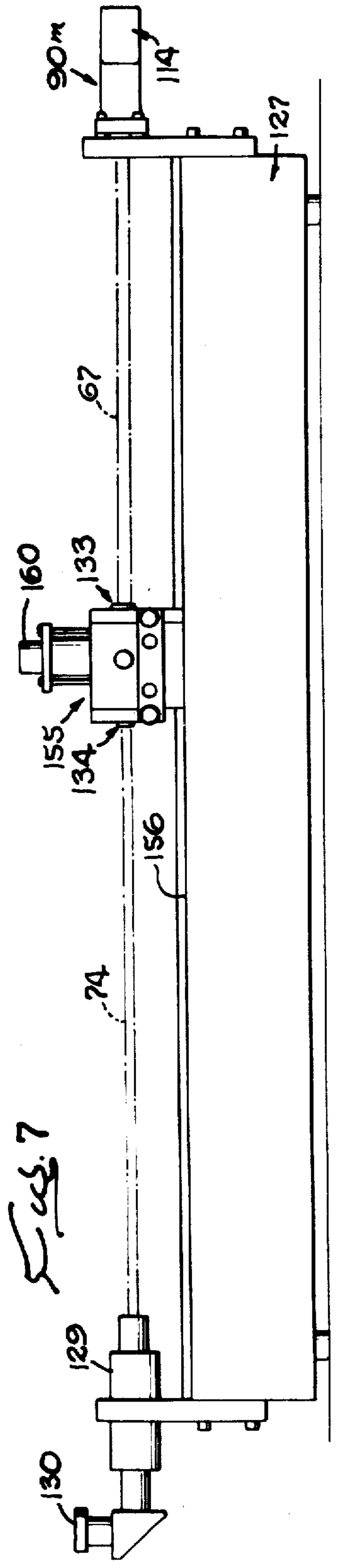
FIG. 7 is a front elevation of an optical bench and of various apparatus used in locating the lamp and the reflectors in precisely established positions.

More specifically, the light source 69 for producing the beam 67 is carried on the outer side of the left end wall 36 of the head 29 (see FIG. 6) and takes the form of a small electric lamp having a base 84, a bulb 85 and a coiled filament 86 formed by a number of helically wound turns 87 (FIG. 14) of tungsten or the like. A small 3 volt lamp such as that designated as No. 1874 by the General Electric Company is as large as is required for use with the present transmitter. The bulb and filament of the lamp 69 are enclosed within a cavity 89 (FIG. 6) formed in a lamp housing 90 which includes a mounting flange 91 attached to the outer side of the left end wall 36 by screws 93. An elongated passage or bore 94 formed through the housing opens into the cavity 89 at one end and is alined at its other end with a hole 95 (FIGS. 6 and 7) extending through the left end wall 36 such that light from the cavity may pass through the bore and the hole for projection of the beam 67 in a horizontal path across the document toward the active scanner 43, 44.

In passing through the bore 94, the light from the lamp 69 is directed first through a condensing lens 96 (FIG. 6) which is held in a precisely fixed position in the bore by a retainer 97 and an adapter 99. Thereafter, the light passes through an iris 100 having an aperture with a diameter of approximately 0.004 inch, and is directed through an optical lens 101 which collimates the light rays such that the rays of the beam 67 directed across the document 27 generally parallel one another. With the light beam 67 being collimated, the size or cross-sectional area of the beam striking the active scanner remains substantially the same regardless of the distance of the scanner from the lamp thereby to insure that the size and intensity of the spot 71 reflected onto the document will remain constant as the scanner travels across the document. The spot is quite tiny and in this instance, is approximately 0.0035 inch in diameter.

To focus the lens 101 with respect to the iris 100 in order to collimate the light beam 67, the lens is held by a retainer 103 (FIG. 6) in a tubular holder 104 which is selectively shiftable within the bore 94 to enable adjustment of the spacing between the lens and the iris. External threads on the holder are screwed into a threaded insert 105 fixed in a bore such that the spacing between the lens and the iris may be adjusted simply by rotating the holder and without need of removing the lens from the holder. After the lens has been focused, a lock nut 106 threaded over the holder is tightened against the insert 105 to lock the holder and the lens in their adjusted positions. The lens usually is adjusted prior to attaching the lamp housing 90 to the end wall 36 and, after the housing has been attached, is aimed to direct the beam 67 along a horizontal path paralleling the document 27 and spaced upwardly from the document a precise distance of 0.781 inch. To facilitate aiming of the beam along the correct path and at the proper height, compressible Teflon washers 107 (FIG. 6) encircling the screws 93 are sandwiched between the end wall 36 and the mounting flange 91 to allow each screw to be tightened to the degree necessary to attach the housing 90 to the end wall in a position to aim the beam correctly.

To detect the true shade value of the document 27, the light beam 67 and the spot 71 should be of high intensity in order to reduce the degrading effect of ambient light on the intensity of the beam 74 transmitted to the photomultiplier 81. To increase the intensity of the beam 67 (in terms of lumens), a concave collector mirror 109 (FIGS. 2 and 6) is positioned on the side of the lamp 69 opposite the bore 94 to reflect the light back toward the lamp and into the bore. The mirror is disposed in a bore 110 opening into the cavity 89 and alined with the bore 94, and is held in a precisely fixed position between a pair of retainers 111 and 113.

Figure 14:
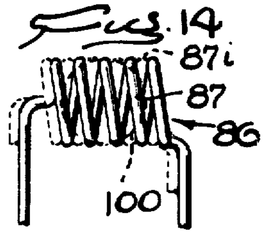
FIG. 14 is an enlarged view of the filament of the lamp.

Light of maximum intensity is produced when the lamp 69 is disposed in a precisely established position (shown in FIG. 6) with the filament 86 centered at the center of curvature of the mirror 109 and located such that the reflected image **87*i* (FIG. 14) of the helical turns 87 of the filament become interlaced with the actual turns as shown schematically in FIG. 14 to produce a solid spot of light for projection through the iris 100. Thus, by locating the lamp filament in a precisely established position in the lamp housing 90, a light beam 67 of greater intensity is directed toward the scanner to enable better detection of the true shade value of the document 27**.

Advantageously, the lamp 69 is pre-mounted and pre-located accurately in its own permanent holder 114 (FIG. 6) which is attached releasably to the lamp housing 90 and which, as an incident to being attached to the housing, automatically locates the lamp filament 86 in its precisely established position shown in FIG. 6 without requiring adjustment of the lamp to place the filament in such position. Moreover, all replacement lamps are pre-located accurately in similar permanent holders such that, when one lamp burns out, a new lamp and holder may be attached to the housing 90 with assurance that the filament of the new lamp will be placed in the same precisely established position in the housing even though the lamps vary dimensionally from one another and are not manufactured to strict tolerances.

In the present instance, the lamp holder 114 is located at one side of the lamp housing 90 and comprises four side walls 115 (FIG. 6) and an end wall 116 defining a socket 117 of rectangular cross-section for holding the base 84 of the lamp 69, the socket having an open end around which extends a mounting flange 118 formed integrally with the side walls. The cavity 89 in the housing opens out of one wall 119 of the housing and is alined with the open end of the socket 117 to receive the bulb 85 and the filament 86 of the lamp when the holder is attached to the housing with the base 84 mounted in the socket.

Before the holder 114 is attached to the housing 90, the lamp 69 is pre-located in an accurate position in the holder so that, when the holder is attached, the filament 86 will be located in the housing in a precise position relative to the mirror 109 and will be disposed exactly as shown in FIG. 6. For this purpose, four nylon or other non-conductive adjusting screws 120 spaced 90° from one another are threaded through the four side walls 115 of the holder 114 and an additional adjusting screw 121 is threaded into the end wall 116 of the holder to hold the base 84 of the lamp spaced from the walls and to enable adjustment of the base in the socket 117 to the position necessary to locate the filament correctly in the housing 90. The lamp is inserted into the socket with the base supported on the screws and with electrical leads 123 (FIG. 6), which are soldered to the terminals of the lamp, extending outwardly of the holder through small holes (not shown) in the walls. After adjustment of the screws to shift and locate the base precisely in the socket, a quantity of flowable cement 124 (FIG. 6) such as epoxy resin is poured into the socket and is allowed to harden to bond the lamp base rigidly to the walls of the socket and thus hold the lamp permanently in the socket in the position established by adjustment of the screws.

Figure 13:
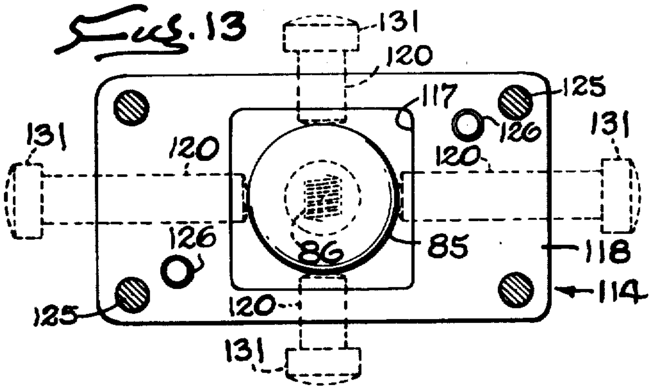
FIG. 13 is a fragmentary cross-section taken substantially along the line 13—13 of FIG. 6.

With the lamp 69 held securely in and located accurately relative to the holder 114, the latter is attached to the wall 119 of the lamp housing 90 by four screws 125 (FIG. 5) projecting through the flange 118 on the holder and threaded into the wall 119. Holes in the housing wall 119 receive leader pins 129 (FIGS. 6 and 13) projecting from the adjacent side of the flange to position the holder precisely on the housing and, in addition, the opposing flange and wall surfaces are machined accurately to mate perfectly with one another and thus insure precise positioning of the holder when the screws 125 are tightened. Accordingly, with the base 84 of the lamp previously anchored in an exact position in the socket 117 and with the holder 114 accurately located on the housing 90, the filament 86 is set automatically in its precisely established position in the housing as an incident to attachment of the holder so that light of maximum intensity will be directed through the bore 94 and across the document 27.

In order to locate the lamp 69 accurately in the holder 114 so that the filament 86 will be positioned precisely when the holder is attached to the housing 90, use is made of a master lamp housing **90*m* (FIGS. 7 and 9) identical to the housing 90 and secured to one end of an optical bench 127 with its iris 100*m* alined with a telescope 129 (FIG. 7) located at the other end of the bench. After the lamp has been placed in an approximate position in the holder, the latter then is secured to the master housing on the bench, the lamp initially having been positioned in the holder such that the filament 86 faces the iris 100*m*. With the lamp energized through a voltage source, a technician looks through a viewer 130 on the telescope to determine the location of the filament relative to the iris 100*m*. Thereafter, the screws 120 and 121 are adjusted inwardly or outwardly to shift the lamp in three mutually perpendicular directions until the technician sees through the telescope that the filament is centered both vertically and horizontally with respect to the iris 100*m*. Fine adjustments of the screws then are made until a perfectly solid light spot of maximum intensity is seen through the telescope thus indicating that the turns 87 of the filament are interlaced with the turns of the image 87*i* reflected off of the mirror 109*m* as shown in FIG. 14. When such a spot develops, the filament is located precisely relative to the mirror to direct light of maximum intensity through the iris 100*m* of the master housing and, since the actual housing 90 on the transmitter 25 is identical to the master housing, the filament will be located in the same precise position relative to the mirror 109** in the transmitter housing to produce light of the same high intensity when the holder is subsequently attached to the transmitter housing.

After the lamp 69 has been adjusted in the holder 114 to position the filament 86 correctly in the master housing 90*m*, the holder is detached from the housing and the cement 124 is poured into the socket 117 to hold the lamp permanently in its adjusted position. When the cement has hardened, the heads 131 (FIG. 13) of the screws 120 and 121 are sawed off to leave the outer ends of the screws flush with the walls 115 and 116 of the holder thereby to insure against subsequent turning of the screws to disturb the position of the lamp or to loosen the hardened cement. The lamp 69 with its permanent holder 114 then is ready for attachment to the transmitter lamp housing 90 and, as an incident to such attachment, the filament 86 is placed in its correct position automatically. When the lamp burns out, the holder is detached and is replaced with a similar holder having a lamp which has been pre-adjusted and pre-mounted on the optical bench 127. Accordingly, no adjustments are necessary at the time a new lamp is installed.

It will be apparent from the foregoing that the use of lamps 69 pre-mounted in individual permanent holders 114 which are interchangeable on the lamp housing 90 enables the filament 86 of each lamp to be located correctly in the housing without adjustment at the time of installation even though the filaments or bases of the different lamps vary slightly in size or placement as a result of inaccuracies inherent in high speed manufacture of the lamps. Accordingly, the manufacturers of the transmitter can supply the user with replacement lamps and holders with assurance that, without any elaborate or time consuming adjustments on the part of the user, the lamps will be positioned properly to produce light of maximum intensity and thus promote the production of sharper facsimiles.

Figure 4:
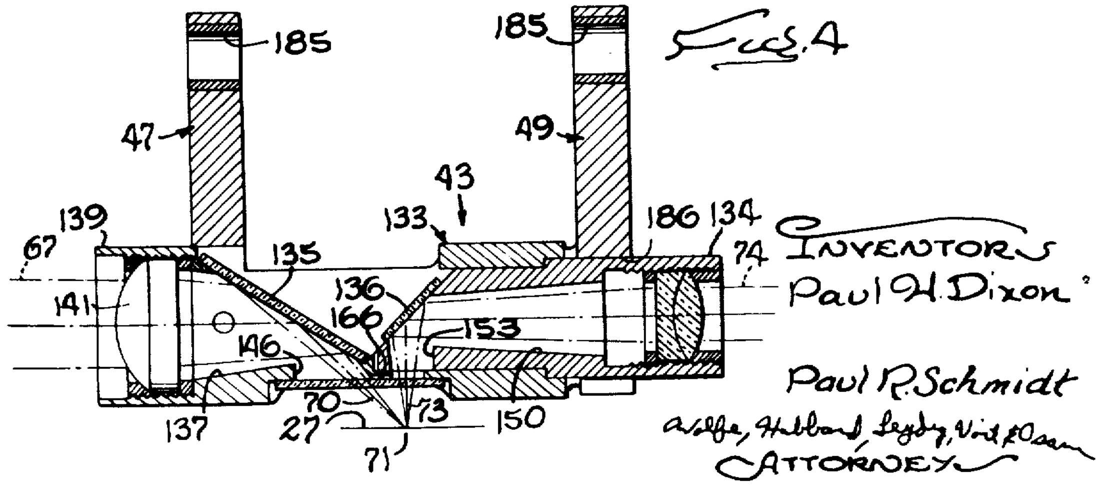
FIG. 4 is an enlarged fragmentary cross-section taken substantially along the line 4—4 of FIG. 3.

In its primary aspect, the present invention contemplates constructing each of the scanners 43, 44 as two telescopic units 133 and 134 (FIGS. 4, 15 and 16) which carry separate and relatively inexpensive reflectors 135 and 136, respectively, for properly focusing the light beam 67 on the document 27 and for picking up the light 73 reflected from the document and accurately directing the light beam 74 to the photomultiplier 81. Initially, the two telescopic units are adjustable both angularly and axially with respect to one another to enable relative location of the reflectors in precisely established positions so as to effect proper focusing of the light beam 67 onto the document and proper aiming of the light beam 74 toward the photomultiplier. After being adjusted, the units are fastened together rapidly to hold the reflectors permanently in their precisely established positions.

Figure 15:
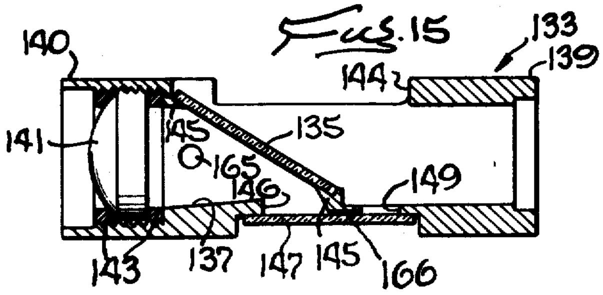
FIG. 15 is a longitudinal cross-section taken through one of the scanner units before assembly of the scanner.

Herein, the unit 133 of the scanner 43 is shown in FIG. 15 and comprises a tubular member formed with an axially extending cylindrical bore 137 which opens out of both the inboard and the outboard ends 139 and 140 of the unit, the inboard end telescopically receiving the unit 134 and the outboard end facing the lamp 69 as the scanner travels across the document 27. The light beam 67 directed from the lamp passes into the outboard end of the unit 133 and through an achromatic lens 141 held in a predetermined position in the bore by threaded retainers 143. After passing through the lens, the light is directed against the reflector 135 which herein simply comprises a plane first surface glass mirror located within the bore 137 of the unit and inclined at an angle of about 25° to the horizontal to reflect the light rays 70 downwardly onto the document. The mirror 135 is placed into the bore 137 through an opening 144 at the upper side of the unit 133 and is cemented to inclined shoulders 145 formed in the walls of the bore to locate the mirror at the proper angle within the unit.

In being reflected from the mirror 135 onto the document 27, the light rays 70 passing through a hole 146 (FIG. 15) formed in the lower wall of the unit 133 and opening into the bore 137. The hole is covered by a transparent glass window 147 with low reflection optical coatings on both sides and bonded to the outer side of the unit by cement. The window also covers a second hole 149 formed through the lower wall of the unit and opening into the bore.

Figure 16:
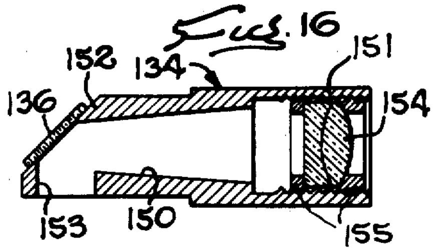
FIG. 16 is a view similar to FIG. 15 but showing the other scanner unit before assembly of the scanner.

As shown in FIG. 16, the unit 134 for the scanner 43 also comprises a tubular member formed with an axially extending bore 150 which opens out of both the outboard and inboard ends 151 and 152 of the unit. The inboard end 152 of the unit 134 is sized and shaped to telescope with a slidable and rotatable fit into the inboard end of the bore 137 formed through the unit 133 and, when the two units are telescoped together (see FIG. 4), the hole 149 in the female unit 133 becomes alined with a hole 153 (FIG. 16) formed in the lower wall of the male unit 134 and opening into the bore 150.

The light 73 reflected upwardly off of the document 27 passes through the window 147 and the holes 149 and 153 and strikes the reflector 136 carried by the male unit 134. This reflector also comprises a plane first surface glass mirror inclined oppositely of the mirror 135 at angle of 45° to the horizontal and cemented to a correspondingly inclined surface at the inboard end 152 of the male unit to cover the inboard end of the bore 150. Light reflected off of the pick-up mirror 136 is directed into the bore 150 and passes into a combination lens 154 (FIG. 16) fastened in the outboard end of the bore by retainers 155 and operable to collimate the rays and direct the resulting beam 74 ahead of the scanner toward the iris 77 and the photomultiplier 81. Because the rays of the beam 74 are collimated, the cross-sectional area of the beam as received by the photomultiplier is substantially uniform irrespective of the distance of the travelling scanner from the photomultiplier.

Figure 8:
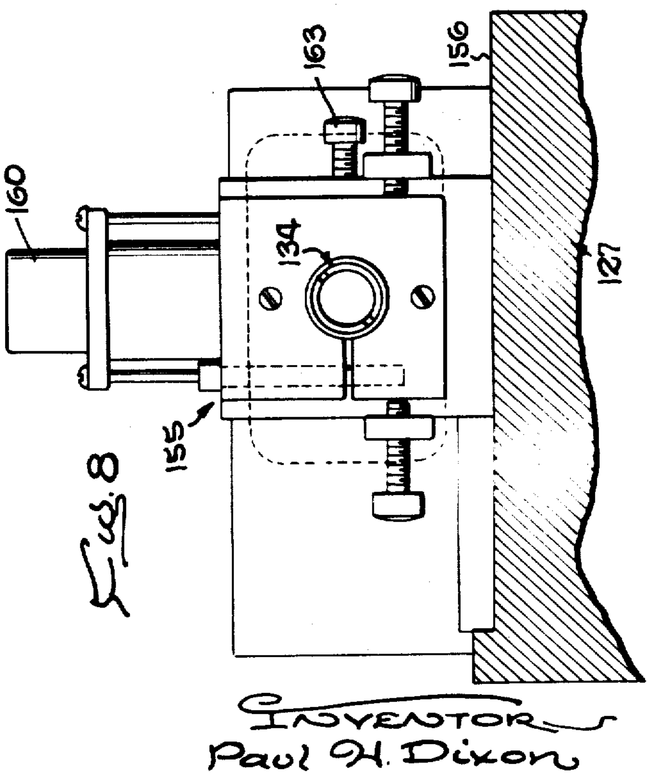
FIG. 8 is an enlarged end view of parts shown in FIG. 7.

For the intensity of the light directed to the photomultiplier 81 to be truly representative of the shade value of the document 27, the light beam 74 must be aimed parallel to the document and must be centered with respect to the iris 77 thus requiring that the reflecting face of the pick-up mirror 136 be precisely positioned, both angularly and axially, relative to the reflecting face of the mirror 135. In carrying out the invention, advantage is taken of the two mirrors mounted in the separate units 133 and 134 to enable such relative positioning of the reflecting faces to be established accurately. For this purpose, the two units, with the mirrors cemented in place, are inserted into a fixture 155 (FIGS. 7 and 8) on the optical bench 127 and are adjusted axially and angularly relative to one another while light is directed against the mirrors to indicate their relative positions. Once the mirrors have been adjusted to the correct positions, the two units are fastened together rigidly to hold the mirrors permanently in such positions.

More particularly, the fixture 155 rests on a ground upper surface 156 (FIG. 8) of the optical bench and is positioned accurately on the bench such that a bore 157 (FIG. 9) extending through the fixture is alined precisely with the telescope 129 and with the iris 100*m* of the master lamp housing 90*m* on the bench, the master housing being equipped with a lamp 69 for directing a collimated light beam 67*t* toward the bore. The two units 133 and 134 are placed loosely in the bore 157 with the lens 141 facing the lamp 69 and then are telescoped together into assembled relationship after the telescoping surfaces of the two units have first been coated with flowable epoxy or other suitable cement. Within the bore 157, the units 133, 134 are positioned such that the mirrors 135, 136 face upwardly toward a glass 159 (FIG. 9) forming part of a viewer 160 on the fixture and having a set of cross hairs 161 (FIG. 10) with their center located in vertical alinement with the axis of the bore. The glass 159 is positioned above the axis of the two units the same distance (i.e., 0.78 inch) that the document 27 is spaced below the centerline of the light beam 67 in the actual transmitter 25. Accordingly, the various elements on the optical bench are set up in the same manner as the actual elements in the transmitter with the glass 159 simulating the document and with the telescope 129 simulating the iris 77 for directing the light beam 74 to the photomultiplier 81.

Figures 9, 10, 11, 12:
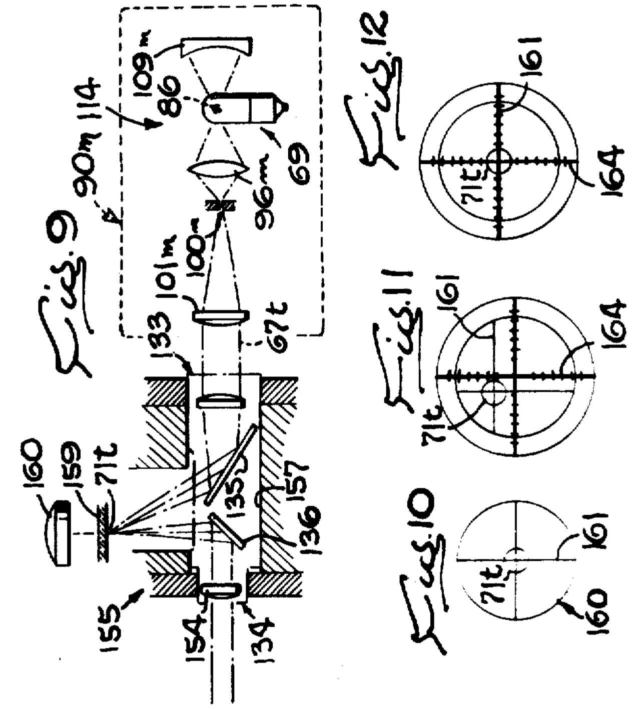
FIG. 9 is a diagrammatic view of parts shown in FIGS. 7 and 8 and illustrating the adjustment of the reflectors to precisely established positions.
FIGS. 10 to 12 are diagrammatic views showing a simulated light spot and the movements undertaken by the spot as the reflectors are adjusted.

With the elements thus set up on the optical bench 127, the light beam 67*t* is directed into the lens 141 of the female unit 133 and is reflected upwardly by the mirror 135 to form a test spot 71*t* (FIGS. 9 and 10) on the glass 159. Thereafter, the female unit is rotated and shifted axially in the bore 157 until the spot 71*t* becomes centered on the cross hairs 161 as shown in FIG. 11 and thus locate the mirror 135 in a reference position in which the spot 71*t* is focused at a distance of 0.781 inch from the axis of the two units 133, 134 and is located with its center lying in a vertical plane extending through such axis. The female unit then is locked in its adjusted position by tightening a clamping screw 163 (FIG. 8) associated with the fixture.

Next, the fixture 155 is turned end-for-end on the optical bench 127 and is positioned such that the light beam 67*t* from the lamp 69 is directed into the lens 154 in the male unit 134. The light is reflected upwardly onto the glass 159 by the mirror 136 and forms a light spot on the glass similar to the spot 71*t*. The male unit then is rotated and shifted axially within the female unit 133 until the mirror 136 is axially and angularly positioned to center the light spot on the cross hairs 161 on the glass in the same location that the spot 71*t* was centered previously. Thus, when the scanner 43 is installed in the transmitter 25 such that the light beam 67 is again directed into the female unit 133 and reflected onto the document 27 by the mirror 135, the resulting tiny spot 71 will be in the exact center of all of the rays of light reflected upwardly off of the document toward the pick-up mirror 136 and ultimately will be in the center of the beam 74 and in the center of the light directed through the iris 77 to the photomultiplier 81. As a result, the intensity of the light seen by the photomultiplier will vary precisely in proportion to changes in the shade value of the scanned portion of the document thereby resulting in the production of more nearly perfect facsimiles.

After the male unit 134 has been rotated and shifted within the female unit 133 to locate the pick-up mirror 136 correctly, the male unit is locked in its adjusted position in the fixture 155. The two units then are left undisturbed until the epoxy hardens to bond the units rigidly together and hold the mirrors permanently in their precisely established positions relative to one another.

As an alternative to turning the fixture 155 end-for-end on the optical bench 127 to effect positioning of the pick-up mirror 136, the fixture may be left positioned as shown in FIG. 9 in which the light beam 67*t* is directed into the female unit 133, and the telescope 129 may be used to determine when the male unit 134 has been shifted and rotated to the correct position to locate the mirror 136 properly relative to the mirror 135. After the female unit 133 has been shifted and rotated within the bore 157 of the fixture as before to center the test spot 71*t* on the cross hairs 161 as shown in FIG. 10, the technician looks through the telescope 129 to determine the position of the spot relative to a set of cross hairs 164 (FIG. 11) built into the telescope and centered in a position which simulates exactly that of the iris 77 of the transmitter 25. Since the mirror 136 usually will not be positioned correctly when the male unit 134 is first placed into the female unit 133, the light spot 71*t* and the image of the cross hairs 161 in the beam 74*t* (FIG. 9) reflected off of the mirror 136 to the telescope thus most often will be off center with respect to the center of the cross hairs 164 as shown in FIG. 11 when the technician first looks into the telescope. The male unit 134 then is rotated and shifted within the female unit to adjust the mirror 136 angularly and axially until the centers of the light spot 71*t* and the two sets of cross hairs 161, 164 coincide exactly with one another (see FIG. 12) as viewed through the telescope. When these conditions prevail, the test spot 71*t* is located in the exact center of all of the light picked up by the mirror 131 and thus the actual spot 71 will be centered with respect to the iris 77 when the scanner 43 is attached to the transmitter 25.

Usually, it is desirable to use one of the two above-described methods of locating the mirror 136 as a check on the accuracy obtained by using the other method. In this way, detection and correction can be made of any minor deviations resulting from such factors as distorted refraction of the light as it passes through the lenses 141 and 154 and the window 147.

To advantage, the mirror 135, the lens 141 and the window 147 are sealed tightly to the female unit 133 to establish within the unit an air-tight compartment which is charged with an inert gas such as nitrogen to prevent condensation from collecting on and clouding the glass elements. After the two units 133 and 134 have been bonded together, nitrogen is admitted into the unit 133 through a hole 165 (FIG. 15) communicating with the bore 137, such hole being plugged after the compartment has been charged. The nitrogen flows into the bore 150 of the male unit 134 through a passageway 166 (FIGS. 4 and 15) leading between the two units, and thus clouding of the mirror 136 and the lens 154 also is prevented. The mirror 136 and the lens 154 are sealed tightly to the male unit and, in addition, the epoxy establishes an air-tight seal around the telescoping surfaces of the two units to prevent the escape of the nitrogen.

In order for the light beam 74 to be aimed correctly at the photomultiplier 81, it is necessary not only that the mirrors 135 and 136 be positioned precisely relative to one another but also that the two scanners 43, 44 be installed in precisely established positions in the transmitter 25 to keep the beam 74 parallel to the document 27 and centered with respect to the iris 77. Also, since the two scanners alternately scan the document, both must be installed identically in order for each to transmit the light beam 74 along the same path.

In another of its aspects, the invention contemplates pre-locating each scanner 43, 44 in an accurate position identical to the position which the scanner must occupy to direct the light beam 74 accurately when the scanner actually is installed in the transmitter 25. With the scanner held in its pre-located position, the scanner mounting elements 47 and 49 are fastened to the scanner so that, when the mounting elements are subsequently attached to the pivot pin 50 (FIGS. 3 and 5) in the transmitter, the scanner will automatically assume the same accurate position that was pre-located and will direct the light beam 74 correctly.

Figure 19:
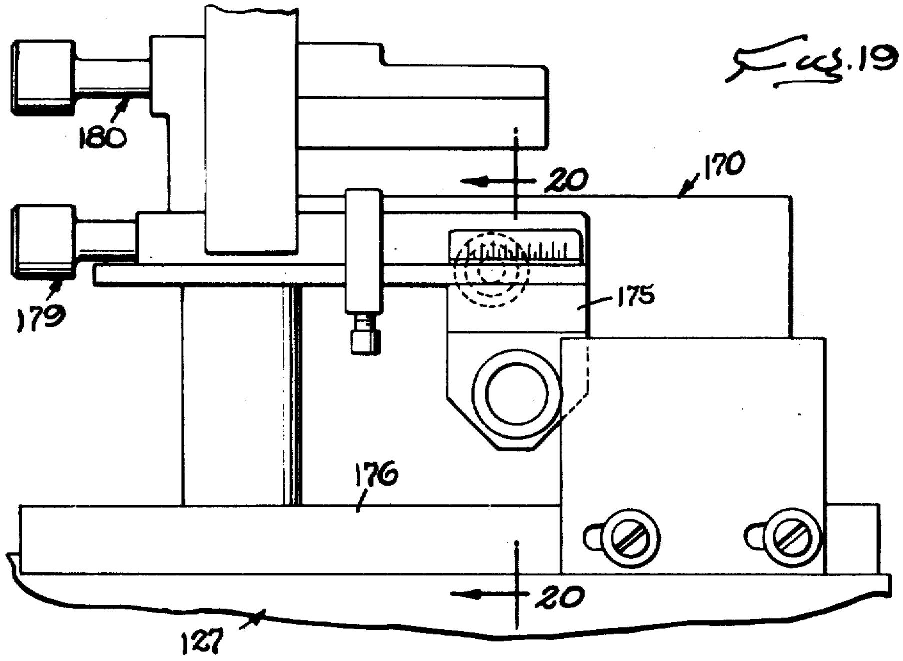
FIG. 19 is a fragmentary end elevation of a fixture on the optical bench, which fixture is used to locate the scanner as the latter is prepared for installation in the transmitter.
Figures 20, 21:
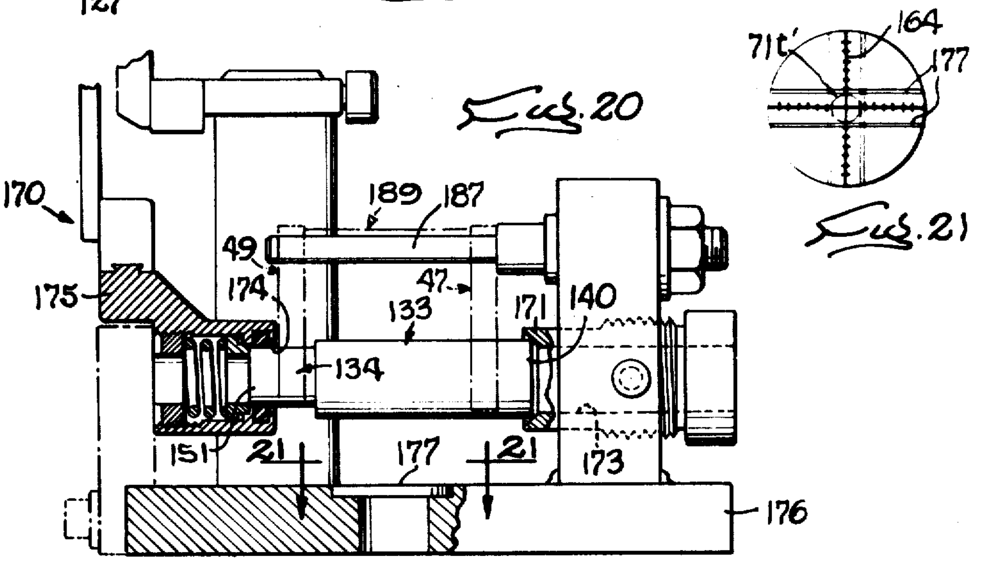
FIG. 20 is a fragmentary cross-section taken substantially along the line 20—20 of FIG. 19.
FIG. 21 is a fragmentary cross-section taken along the line 21—21 of FIG. 20.

Accurate pre-location of each scanner 43, 44 is achieved through the use of a fixture 170 (FIGS. 19 and 20) adapted to be placed on the optical bench 127 and including a coned adjusting chuck 171 (FIG. 20) having a bore 173 alined with the light beam **67*t* directed from the lamp 69 in the master lamp housing 90m on the bench. After the two scanner units 133 and 134 have been bonded together, the scanner is placed in the fixture with the outboard end 140 of the female unit 133 seated in the chuck. The outboard end 151 of the male unit 134 is telescoped into a bore 174 extending through a laterally and vertically adjustable slide 175 formed as part of the fixture, the bore being alined with the telescope 129**.

The light beam **67*t* is directed into the unit 133 and is reflected downwardly by the mirror 135 onto a base 176 of the fixture 170 to form a test spot 71*t*' (FIG. 21) adjacent a double-lined reticle 177 on the base, the latter being spaced below the center of the light beam 67*t* a distance of 0.781 inch. Thereafter, the scanner is shifted axially by adjusting the chuck 171 and also is rotated without the chuck until the light spot 71*t*' is centered generally on the reticle 177. The technician, while looking through the telescope 129, then moves the slide 175 laterally relative to the base 176 with an adjusting mechanism 179 (FIG. 19) to shift the scanner sidewise through a slight distance to center the image of the light spot 71*t*' on the vertical line of the cross hairs 164 of the telescope. Next, the slide is adjusted vertically on the fixture by an adjusting mechanism 180 to raise or lower the scanner and center the image of the light spot 71*t*' on the horizontal line of the cross hairs of the telescope thereby to locate the image of the spot appearing in the mirror 136 a distance of 0.781 inch from the actual spot 71*t*' on the base. Any necessary final angular, axial, sidewise and vertical adjustments of the scanner then are made until the image of the spot 71*t*' is centered precisely on both the reticle and the cross hairs shown in FIG. 21. One the spot is so centered, the position of scanner is such that the spot 71*t*' focuses with a diameter of 0.0035 inch at a distance of 0.781 inch below the light beam 67*t*** and lies in the same vertical plane as the longitudinal centerline of the beam.

Figures 17, 18:
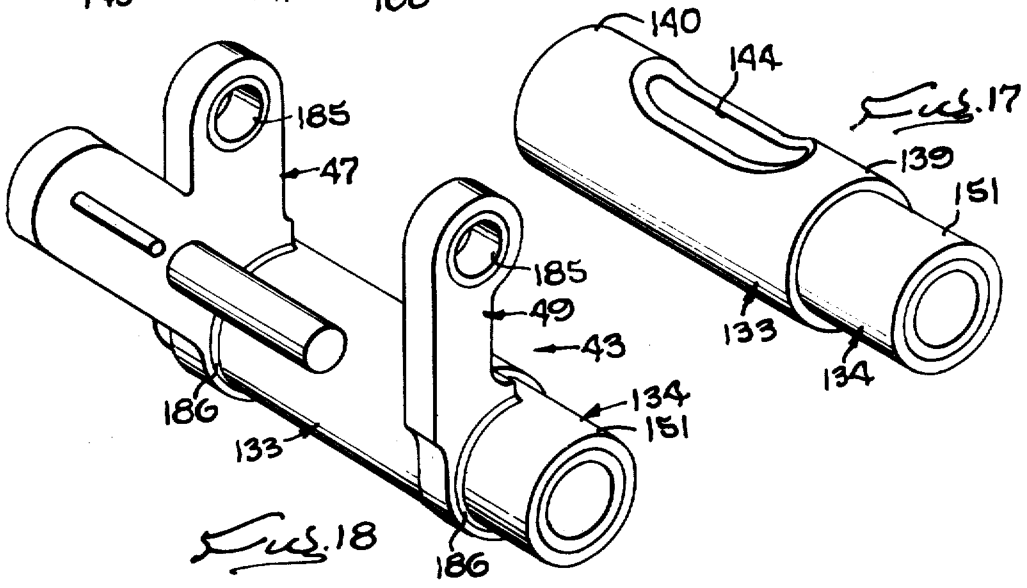
FIG. 17 is a perspective view of the scanner after the two units have been assembled.
FIG. 18 is a perspective view of the scanner as completely assembled and in condition for mounting in the transmitter.

With the scanner thus positioned, the mounting elements 47 and 49 are attached to the scanner while being held in a reference position (see FIG. 20) which simulates the position assumed by the mounting elements when mounted on the pin 50 in the transmitter 25. As shown in FIG. 18, the mounting elements are in the form of hanger arms having holes 185 in their upper ends for receiving the pin 50 on the scanner carriage 46. At their lower ends, the hanger arms 47 and 49 are formed with generally semi-circular cradles 186 for receiving the scanner.

Figure 22:
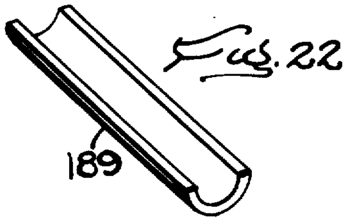
FIG. 22 is a perspective view of a part shown in FIG. 20.

To attach the hanger arms 47, 49 to the pre-located scanner in the fixture 170, the arms are slipped over a fixture pin 187 (FIG. 20) simulating to the mounting pin 50 and overhanging the scanner. A semi-cylindrical shim 189 (FIG. 22) then is placed on the pin between the two arms to establish the proper spacing between the arms. With the arms hanging on the pin in the same position they subsequently will assume when attached to the pin 50, the scanner is bonded to the cradles 186 of the arms by epoxy which is allowed to set before the scanner is disturbed.

From the foregoing, it will be apparent that, when the hanger arms 47, 49 are attached to the pin 50 in the transmitter 25, the scanner will assume the same accurate position in which it was pre-located in the fixture 170. As a result, the light spot 71 will be focused at the proper distance below the light beam 67 and the reflected beam 74 will extend exactly parallel to the document 27 and will be centered with respect to the iris 77. Moreover, each of the scanners 43, 44 will be positioned identically so that the size and direction of the light beam 74 will remain constant regardless of which scanner is actively scanning the document.

We claim as our invention:

1. In a facsimile transmitter scanner adapted to be moved across a document to be reproduced, the combination of, a first member formed with an axially extending bore opening out of one end of said member, a hole in one wall of said member and opening into said bore, a reflector positioned in said bore for receiving light directed into said one end of the bore and for reflecting such light through said hole and onto the document, a second member positioned adjacent said first member and formed with a second axially extending bore opening out of at least one end of said second member with the open end of the second bore facing oppositely of the open end of the first bore, a second hole in one wall of said second member and opening into said second bore, a second reflector positioned in said second bore for receiving light reflected off of the document into said second hole and for reflecting such light out of said one end of said second bore, said members being sized and shaped for telescoping together with a slidable and rotatable fit to enable location of said reflectors in precisely established axial and angular positions relative to one another, and means bonding said members rigidly to one another after said reflectors have been located in said positions thereby to prevent further sliding and rotation of one member relative to the other and to hold said reflectors permanently in said positions.

2. A facsimile transmitter scanner as defined in claim 1 in which the bore in one of said members extends completely through such member and receives the other member when the two members are telescoped together.

3. A facsimile transmitter scanner as defined in claim 1 in which said means comprises a quantity of hardened cement between said members and bonding the latter together rigidly.

4. A facsimile transmitter scanner as defined in claim 1 in which said reflectors comprise plane mirrors fastened to said member and inclined oppositely relative to one another.

5. In a facsimile transmitter scanner adapted to be moved across a document to be reproduced, the combination of, inner and outer members each having inboard and outboard ends and each being formed with an axially extending bore opening out of the outboard end of the respective member, an opening formed in the inboard end of said outer member and sized and shaped to telescopically receive the inboard end of said inner member with a slidable and rotatable fit, means bonding said members together rigidly to prevent relative sliding and rotation of said members, a hole formed in one wall of said inner member near the inboard end thereof and opening into the bore in said inner member, hole means in one wall of said outer member and alined with said hole in said inner member, said hole means also opening into the bore in said outer member, a transparent window carried by said outer member and covering said hole means, and a reflector positioned in the bore of each member with one of the reflectors located to reflect light received through the outboard end of one of said members onto said document through said hole means and said window and with the other of said reflectors located to direct to the outboard end of the other of said members the light reflected from said document and through said hole means and said window.

6. A facsimile transmitter scanner as defined in claim 5 in which said means comprises a quantity of hardened cement between said members for bonding said members rigidly together and for establishing a gas-tight seal between said members.

7. A facsimile transmitter scanner as defined in claim 6 further including a lens positioned within the outboard end of the bore in each member in gas-tight sealing relation with the member, means establishing a gas-tight seal between said window and said outer member, and a charge of inert gas in each of said bores to prevent moisture from condensing on said window, said reflectors and said lenses.

8. A facsimile transmitter scanner as defined in claim 7 further including a passage establishing fluid communication between said bores to permit flow of said gas from one bore to the other.

9. In a facsimile transmitter, the combination of, a frame for supporting a document to be copied; a lamp positioned on said frame to direct rays of light along a predetermined path across the document; a scanner mounted on said frame and movable across the document in said path; said scanner comprising a first member formed with an axially extending bore opening out of one end of said member and alined with said path, a hole in one wall of said member and opening into said bore, a reflector positioned in said bore for receiving light directed along said path into said one end of the bore and for reflecting such light through said hole and onto the document, a second member telescoped with said first member with a slidable and rotatable fit, means bonding said members together rigidly to prevent relative sliding and rotation of said members, said second member being formed with second axially extending bore opening out of at least one end of said second member with the open end of the second bore facing oppositely of the open end of the first bore and being alined with said path, a second hole in one wall of said second member and opening into said second bore, a second reflector positioned in said second bore for receiving light reflected off of the document into said second hole and for reflecting such light out of said one end of said second bore; and a light-to-signal transducer mounted on said frame to receive the light directed out of said second bore and operable to produce an electrical signal varying in accordance with changes in the intensity of such light.

* * * * *